April 7, 1964    C. K. STILLWAGON    3,127,904
DISC VALVE
Filed March 22, 1961

Crawford K. Stillwagon
INVENTOR.

BY Browning, Simms,
Hyer & Eickenroht
ATTORNEYS

United States Patent Office 3,127,904
Patented Apr. 7, 1964

3,127,904
DISC VALVE
Crawford K. Stillwagon, 5325 Kirby Drive, Houston, Tex.
Filed Mar. 22, 1961, Ser. No. 97,618
5 Claims. (Cl. 137—315)

This invention relates to improvements in valves of the character known as butterfly or disc type valves used in food processing and in the manufacture of explosives.

The valves that are used in food processing and the manufacturing of explosives must be periodically removed from service and disassembled in order that their fluid containing parts can be thoroughly cleaned because of the undesired accumulation of fluids and fluid carried materials in the crevices of such valves. The term "crevices" is used to denote openings in and between the fluid containing parts of the valve wherein fluids and fluid carried materials can accumulate.

These disc valves must be readily disassembled for cleaning and then reassembled in order to be economically satisfactory for use in the above industries. Because the periodic cleaning of such valves is contingent and resultant upon the accumulation of materials in the crevices of such valves, all crevices unnecessary to the operation of the valve should be avoided.

Examples of the crevices that are unnecessary are those created between the disc and seat of the valve upon movement of the operating stem due to a rigid connection between the disc and stem. There will also be a movement of the disc in the flow passageway due to changes in the pressure of the fluid contained by such valve which creates unnecessary crevices unless the disc presents equal pressure surfaces to the fluid in all directions.

Efforts to provide a disc valve having a simple inexpensive construction that is both readily disassembled for cleaning and that has a minimum of unnecessary crevices have not for all practical purposes been successful. An example of such unsuccessful efforts resides in the attempt to seal the crevices about a bolt, or the like, used to rigidly connect the disc to the stem and which must pass through at least one face of the disc. The bolt head can be brazed to the fact of the disc to seal the crevices therein but such sealing effectively prevents a ready disassembly of the valve.

It is therefore an object of the present invention to provide an improved disc valve especially suitable for use in food processing and explosive manufacturing.

A further object is to provide a disc valve that is readily disassembled to facilitate the cleaning of its fluid containing parts.

Another object is to provide a disc valve for use in food processing without unnecessary crevices wherein fluid contained materials can accumulate.

A further object is to provide a disc valve in which the fluid pressure created forces acting on the disc are equal in all directions.

Yet another object is to provide a disc valve in which the disc is free to center itself within the opening through the valve body independently of the movements of the stem.

Another object is to provide a disc valve wherein the stem is non-rotatably connected with the disc without using screws or the like extending through the face of the disc so that no means of access for fluid is thereby provided to the interior of the disc and no unnecessary crevices are provided around the screws or the like.

These and other objects will become more apparent when read in conjunction with the following detailed description and the attached drawing of the preferred illustrative embodiment of the present invention, wherein.

Figure 1:
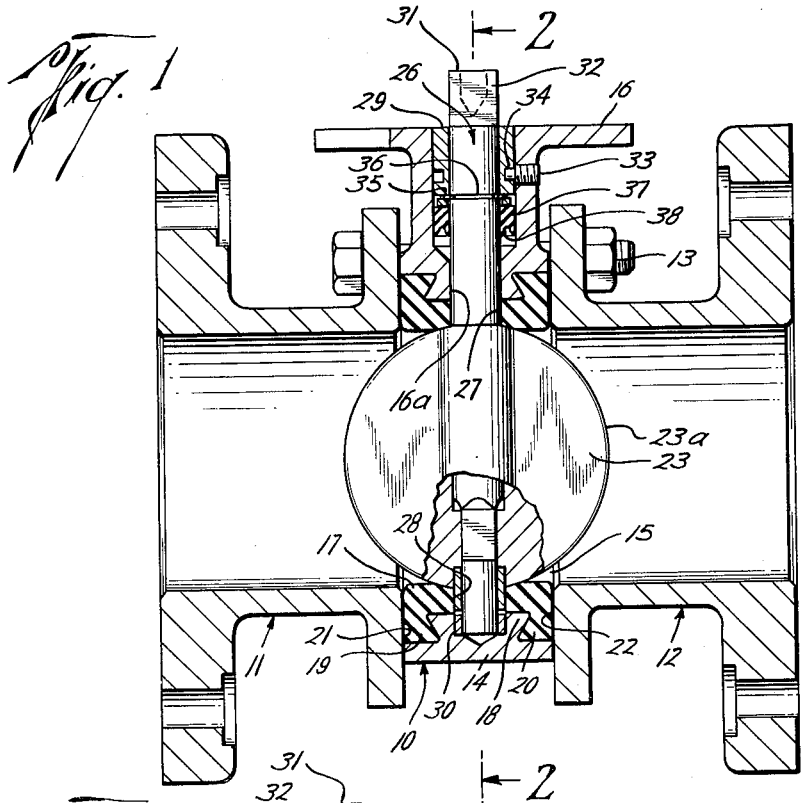
FIG. 1 is an elevation in vertical cross section illustrating a valve embodying this invention and provided with flanged fittings adapted for connecting it in a conduit.

The objects of the present invention are accomplished by the valve illustrated in the drawing and fully described hereafter. The valve has a body adapted to be connected in a conduit and which is provided with a flow passageway therethrough. An annular resilient seat is positioned within the body about such passageway. A vanes or disc is operably positioned within the passageway in the body to cooperate with the seat to control flow therethrough and is mounted on a stem that extends from without the body through the disc and the seat at two places. In the valve disclosed the objects are accomplished by the arrangement in which the stem and disc are provided with means for non-rotatably connecting them together and such means is slidably releasable merely by axial movement of the stem relative to the disc so that the stem can be withdrawn by its projecting end from the assembled valve to permit removal of the disc from the valve body.

Referring to FIG. 1 of the drawings, there is illustrated a valve 10 releasably connected to flange fittings 11 and 12 by bolts 13. The flange fittings 11 and 12 are of conventional construction and are adapted to be connected into a conduit. Other forms of valve bodies having integral conduit connecting portions can be used if it is so desired.

The valve 10 is comprised of a body 14 having a fluid passageway 15 therethrough and having an upstanding neck 16. An annular resilient seat 17 is positioned within the valve body 14 about its fluid passageway 15. The seat 17 is securely held in place by its mounting upon the dovetail rib portion 18 of the body 14 and by having its side flange parts 19 and 20 sandwiched between the dovetail rib 18 and the end faces 21 and 22 of the flanged fittings 11 and 12, respectively. In this manner, there are no crevices exposed to the fluid between the seat and the body.

Operably positioned within the passageway 15 and body 14 is a disc 23 for controlling flow of fluids therethrough. The seat 17, it will be seen, provides a seal between the body 14 and the flange fittings 11 and 12, and it is also arranged to provide a seal about disc 23. To accomplish this, the seat 17 is so constructed and arranged that upon assembly of the valve the internal diameter of the seat is somewhat smaller than the external diameter of the disc 23 at its edge 23a. Thus, the edge 23a of disc 23 engages and slightly compresses the resilient seat about the entire perimeter of the disc when the disc is in closed position. The particular differential in diameters between the disc and seat is not particularly critical but should be sufficient to insure that the disc makes a tight engagement around its full circumference with the seat.

The disc 23 is removably mounted upon a stem 26 which extends substantially perpendicular to the longitudinal axis of the passageway 15 through the body 14. The body 14 is apertured at 16a to receive the stem 26, the aperture extending completely through the neck 16. Axially aligned with aperture 16a is a recess 14a provided in the body on the opposite side of passageway 15. The disc 23 is provided with an opening 24 to receive the stem 26 in a manner such that a non-rotatable connection, to be more fully described hereafter, is provided between the disc and stem. The stem 26 is journaled within body 14 by means of bushings 29 and 30 and passes through the seat 17 at two places via openings 27 and 28 provided therein.

The projecting end 31 of stem 26 is provided with a plurality of surfaces 32 whereby conventional stem rotating means (not shown) can be secured thereto to operate the valve.

The valve insofar as hereinabove described is, in general, as illustrated in my prior Patent No. 2,740,423, issued April 3, 1956.

To insure that the stem 26 will not be unintentionally removed from the valve 10, a stem locking means can be provided. The stem locking means is shown as a set screw 33 carried in neck 16 that is engageable with a groove 34 in bushing 29. A snap ring 35 is carried in a groove 36 in stem 26 and is adapted to seat against the lower face of bushing 29. This arrangement effectively limits the upward axial movement of the stem 26 as it is viewed in the position shown in FIG. 1. This arrangement does not limit its downward movement however.

A secondary fluid seal 37 may be provided about the stem 26 in neck 16 if desired. The secondary fluid seal 37 is illustrated as a pressure actuated annular resilient sealing ring having a groove 38 presented toward the flow passageway of the valve. Other forms of sealing rings may be used if so desired.

Figure 2:
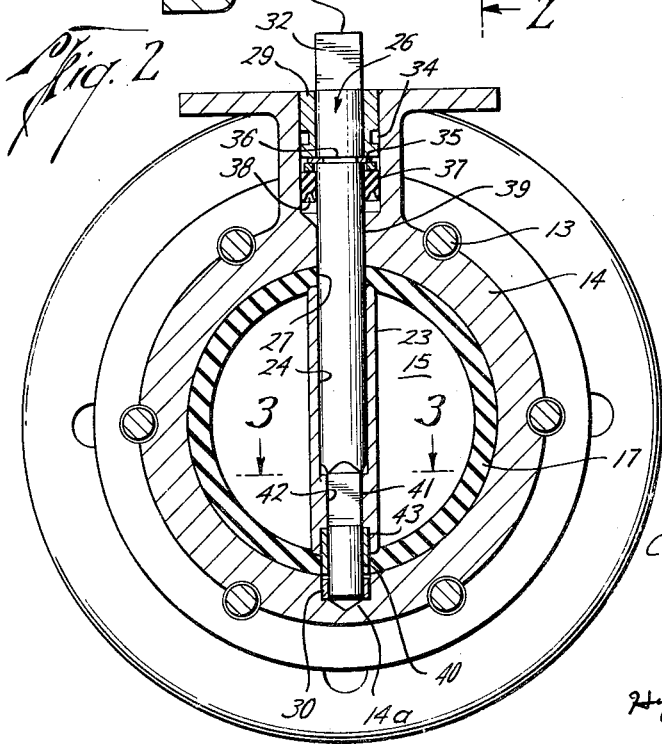
FIG. 2 is a section taken along line 2—2 of FIG. 1.
Figure 3:
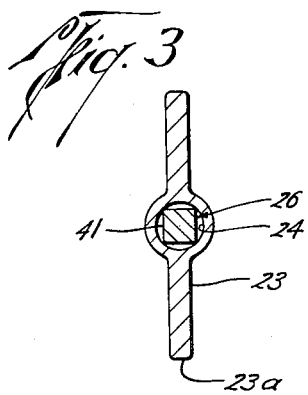
FIG. 3 is a section taken along line 3—3 of FIG. 2.

Referring more particularly to FIGS. 2 and 3 of the drawing, the non-rotatable connection between the stem 26 and disc 23 will be described. The non-rotatable connection between the disc and stem is adapted to be released upon axial movement of the stem relative to the disc so that the stem can be withdrawn by its projecting end 31 from the assembled valve to permit removal of the disc 23 from the valve body 14. As will be apparent from the following description, the non-rotatable connection is slidably disengageable, without rotation or other type of movement.

The stem 26 has a cylindrical portion 39 extending from adjacent surfaces 32 on its projecting end 31 through opening 27 in seat 17 to intermediate its ends. A bearing engaging portion 40 preferably of a reduced diameter cylindrical configuration is provided on the stem 26 remote from its projecting end 31 and is received in bushing 30 positioned in recess 14a in body 14.

The stem 26 is provided with any suitable cross-sectional configuration that will provide, when engaged with a corresponding portion in the disc, a non-rotatable slidably disengageable connection therewith. The intermediate portion 41 is provided between the cylindrical portion 39 and the bearing engaging portion 40. This intermediate portion 41 can have a cross section which is something other than circular and coaxial relative to the rotative axis of the stem and is uniform throughout its length. The opening 24 through disc 23 is provided with a complementary cross-sectional portion 42 wherein is received the intermediate portion 41 of the stem to provide a non-rotatable connection between the disc and the stem. The slidable disengagement of the non-rotating connection of the stem from the disc is provided in order that the non-rotatable connection is released upon axial movement of the stem relative to the disc, and is provided by the following structural arrangement. In order that the stem 26 can be withdrawn by its projecting end 31, the intermediate portion 41 has no greater radial dimension than the radial dimension of cylindrical portion 39 of the stem. Likewise, the bearing engaging portion 40 has no greater radial dimension than the smallest radial dimension of the intermediate portion 41. Thusly, each portion of the stem has no fixed greater radial dimension than the least radial dimension of that portion of the stem more closely adjoining the projecting end 31 of the stem 26. This arrangement permits the portions of the stem remote from the projecting end 31 to pass through the least opening in the neck 16 or upper bushing 29 as the case may be and also through the opening 24 of disc 23.

The intermediate portion 41 can be formed in a number of ways, such as by relieving a portion of the exterior surface of the cylindrical portion 39 of stem 26 to produce the desired non-cylindrical configuration (as above defined). The intermediate portion 41 is illustrated as a square cross-sectional portion formed on stem 26 which is received within a complementary sectional portion 42 of opening 24 in disc 23. In this manner a non-rotating connection is effected.

By use of a non-cylindrical cross-sectional portion on the stem, the non-rotatable connection between the disc and stem is accomplished without having to use screws or bolts which pass through the face of the disc and hence, the crevices normally present about such fastening means are avoided. Additionally, the disc has a uniform continuous exterior surface without projections presented to fluid flow and, therefore, materials carried in the fluid have no tendency to accumulate on the smooth surface of the disc. This advantage is readily apparent when compared to the heretofore used fastening means which had screw heads or the like projecting from the disc and the undesired effects created by such projections.

With the heretofore described arrangement, the valve can be readily cleaned by first removing it from the flange fittings 11 and 12. Then, the stem 26 is moved axially outwardly to disengage the non-rotatable connection between the stem and disc and thereby permit the disc to be removed from the valve. After the disc is removed, the seat is also easily removed for cleaning. Reversal of the disassembly procedure readily provides for reassembly of the valve.

In order to allow the disc 23 some relative movement on stem 26, so that the operation of the stem 26 in opening and closing the valve 10 does not cause axial displacement of the disc 23, the opening 24 in the disc 23, wherein is received the cylindrical portion 39 of stem 26, extends partially over the squared cross-sectional intermediate portion 41 of the stem 26. This advantageous arrangement permits the necessary axial freedom of movement of the disc on the stem 26. This is an additional advantage in that the disc 23 is free to center itself with seat 17.

In order to equalize the effect of fluid pressures in all directions about the disc 23, the following structure is utilized. A sleeve 43 is pressed into the disc 23 so as to be integrally carried therewith and such sleeve extends from the disc about part of the bearing engaging portions 40 of stem 26 which passes through opening 28 in seat 17. As shown, the sleeve terminates short of bearing engagement with the valve body. Thus it is free of aligning engagement, i.e., engagement which would prevent tilting of the disc to the extent necessary to remove the disc from the body and seat. The diameter of the sleeve 43 is made substantially equal to the diameter of the cylindrical portion 39 of the stem so that the fluid pressure of the fluid being handled, transmitted through the material of the seat acts equally upon the ends of the disc and therefore there is no tendency for the disc to move axially on stem 26 responsively to pressure changes.

The openings 27 and 28 in seat 17 are made slightly smaller than the diameter of the stem and sleeve which are contained therein so as to provide a fluid tight seal about these parts. As can be seen clearly in FIG. 2, the seat 17 also provides a seal against the ends of the boss 25 on disc 23. Thus, there are no crevices formed except those required for the operation of the valve, which are the abutting surfaces of the seat and the disc.

It will be seen that there has been provided a disc valve in which the construction is simple and the minimum of machining is required. The valve is readily removable from the conduit system in which it is used and is readily disassembled for cleaning purposes merely by withdrawing the stem from the valve body. Additionally, the assembled valve has a minimum number of crevices in which materials carried in the fluids controlled by such valves are accumulated. Further, the disc of the valve is not rigidly secured to the stem so that operation of the stem will impart an axial movement to the disc, and further the disc is so arranged that the fluid pressures are equalized about it.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims, As many possible embodiments may be made of the invention without departing from the scope thereof, it is to be understood that all matter herein set forth or shown in the accompanying drawing is to be interpreted as illustrative and not in a limiting sense.

The invention having been described what is claimed is:

1. A disc valve comprising a valve body having a flow passageway therethrough, an annular seat position within the body about such passage having aligned stem receiving openings on an axis transverse to said passageway and being resilient around said openings, a removable stem mounted in the body and seat for rotation about said axis and passing through said openings in the seat at two points, one end of the stem projecting from the body when operably positioned therein, said stem having a cylindrical portion extending from adjacent its projecting end to intermediate its ends, a non-circular portion adjacent the cylindrical portion having no greater maximum radial dimension than the least radial dimension of said cylindrical portion, and the portion of the stem remote from its projecting end having a no greater radial dimension than the least radial dimension of the cylindrical and non-circular portions of said stem, a disc operably positioned in the flow passageway and adapted to co-act with the seat for rotation to control flow through the body, said disc having an opening adapted to receive the stem, the opening having a portion complementary in radial dimension to the non-cylindrical portion of the stem to provide a non-rotating connection therebetween, a sleeve carried on the disc in axial alignment with the stem and extending from the disc about a part of said portion of said stem remote from its projecting end and into the seat and terminating short of aligning engagement with the body, said cylindrical portion and the sleeve having equal outer diameters and the stem receiving openings in the seat being of a smaller diameter than said cylindrical portion and the sleeve, whereby said stem can be withdrawn by its projecting end from the assembled valve to permit removal of said disc and seat from the valve body.

2. A disc valve comprising, a tubular body, an annular resilient seat carried by the body, a removable stem mounted in the body for rotation about an axis transverse to the tubular axis of the body and having one of its ends projecting outwardly from the body, the stem passing through the seat at two points, said stem being cylindrical at its points of passage through said seat and having a reduced diameter end portion remote from its end projecting from the body, said stem having an intermediate non-circular portion between said cylindrical portions, a disc operably positioned in the flow passageway and adapted to co-act with the seat for rotation to control flow through the body, said disc having an opening adapted to receive the stem, the opening having a portion complementary to the intermediate non-circular portion of the stem to provide a non-rotating connection therebetween, a sleeve integrally carried on the disc in axial alignment with the stem and extending from the disc about a part of said reduced diameter end portion of the stem received in one of the openings in said seat, said sleeve having an outer diameter equal to the outer diameter of the cylindrical part of said stem and terminating short of aligning engagement with the body, and the stem receiving openings in the seat being of a smaller diameter than the cylindrical part of said stem and the sleeve.

3. A disc valve comprising, a tubular body, an annular resilient seat carried by the body, a removable stem mounted in the body for rotation about an axis transverse to the tubular axis of the body and having one of its ends projecting outwardly from the body, said stem extending through the seat at two points, said stem being cylindrical at its point of passage through said seat adjacent its end projecting from the body, the cylindrical stem having a reduced diameter end portion remote from its end projecting from the body, and an intermediate portion adjacent said reduced diameter portion in which the exterior surface of said large diameter cylindrical stem portion is relieved in part to provide a non-rotating connecting means, a disc operably positioned in the flow passageway and adapted to co-act with the seat for rotation to control flow through the body, said disc having an opening adapted to receive the stem, the opening having a portion complementary to the non-rotating connecting means portion of the stem to provide a non-rotating connection therebetween, a sleeve integrally carried on the disc in axial alignment with the stem and extending from the disc about a part of said reduced diameter end portion of the stem received in one of the openings in said seat, said sleeve having an outer diameter equal to the outer diameter of the cylindrical part of said stem and terminating short of aligning engagement with the body, and the stem receiving openings in the seat being of a smaller diameter than the cylindrical part of said stem and the sleeve.

4. A disc valve comprising, a tubular body, an annular resilient seat carried by the body, a removable stem mounted in the body for rotation about an axis transverse to the tubular axis of the body and having one of its ends projecting outwardly from the body, bearing means in the body for journaling said stem in the body at its ends, said stem extending through the seat at two points, said stem having a cylindrical portion extending from adjacent the end projecting from the body through said seat at one of its points of passage therethrough, a bearing engaging portion at its end remote from said projecting end passing through the seat at the other point of passage therethrough, and an intermediate portion in which the exterior surface of the cylindrical portion of the stem is relieved to form a non-circular cross-sectioned portion, a disc operably positioned in the flow passageway and adapted to co-act with the seat for rotation to control flow through the body, said disc having an opening adapted to receive the stem, the opening having a portion complementary to the intermediate portion of the stem to provide a non-rotating connection therebetween, a sleeve integrally carried on the disc in axial alignment with the stem and extending from the disc about a part of said end portion of the stem remote from said projecting end and received in one of the openings in said seat, said sleeve having an outer diameter equal to the outer diameter of the cylindrical part of said stem and terminating short of aligning engagement with the body, and the stem receiving openings in the seat being of a smaller diameter than the cylindrical part of said stem and the sleeve.

5. A disc valve comprising a valve body having a flow passageway therethrough and a pair of aligned stem receiving openings in its opposite walls on an axis transverse to said flow passageway, one of said openings extending through the body wall, an annular resilient seat positioned within said body about such passageway and having stem receiving openings therein aligned with the stem receiving openings in the body, the surfaces of said flow passageway through said combined body and seat, except for said stem openings, being continuous and free from cracks and crevices, a stem removably mounted in said stem receiving openings and projecting from the body through said one of said openings, the part of said stem passing through said seat at the position closest to the projection of the stem from the body being slightly larger than the stem receiving opening through said seat when undistorted, to sealingly engage therein, a disc having a continuous outer surface free of cracks and crevices operably positioned within the flow passageway and of maximum dimensions slightly greater than the undistorted corresponding inner dimensions of said seat so as to engage and slightly indent said seat throughout the periphery of said disc when said disc is disposed within and transversely of said flow passageway, said disc having a sleeve-like projection carried thereon engaged within the other stem receiving opening and of a size slightly greater than said other stem receiving opening of the seat to sealingly engage therein, said sleeve being free of aligning engagement with the body and said disc having an opening with continuous walls therethrough from edge to edge of said disc receiving an intermediate portion of said stem and being continuous both through the disc and through the sleeve-like portion, the interior of said opening through said disc and the intermediate portion of said stem having cooperating parts providing a non-rotatable connection for said stem to the disc, said connection being such as to permit relative endwise movement of said stem relative to said disc in at least one direction and adapted to be disengaged by endwise movement of said stem toward said end thereof projecting from the body, said intermediate portion of the stem having its maximum radial dimension no greater than the least radial dimension of the stem adjacent its projecting end and the portion of said stem opposite the projecting end having its maximum radial dimension no greater than the least radial dimension of the opening through the disc.

References Cited in the file of this patent

UNITED STATES PATENTS

| | | |
|---|---|---|
| 1,152,176 | Hennebohle | Aug. 31, 1915 |
| 2,529,572 | Raybould | Nov. 14, 1950 |
| 2,596,787 | Ottinger | May 13, 1952 |
| 2,740,423 | Stillwagon | Apr. 3, 1956 |
| 2,809,662 | Ray | Oct. 15, 1957 |
| 2,847,181 | Muller | Aug. 12, 1958 |
| 3,027,133 | Anderson | Mar. 27, 1962 |

FOREIGN PATENTS

| | | |
|---|---|---|
| 787,140 | Great Britain | Dec. 4, 1957 |